(12) United States Patent
Farine et al.

(10) Patent No.: US 8,837,574 B2
(45) Date of Patent: Sep. 16, 2014

(54) METHOD FOR IDENTIFYING DATA ENCODED BY PPM MODULATION, AND RECEIVER FOR SAID METHOD

(75) Inventors: Pierre-André Farine, Neuchâtel (CH); Cyril Botteron, Gals (CH); Roman Merz, Neuchâtel (CH)

(73) Assignee: Ecole Polytechnique Federale De Lausanne (EPFL), Lausanne (CH)

(*) Notice: Subject to any disclaimer, the term of this patent is extended or adjusted under 35 U.S.C. 154(b) by 821 days.

(21) Appl. No.: 12/934,511
(22) PCT Filed: Mar. 24, 2009
(86) PCT No.: PCT/EP2009/053471
§ 371 (c)(1), (2), (4) Date: Nov. 2, 2010
(87) PCT Pub. No.: WO2009/118323
PCT Pub. Date: Oct. 1, 2009

(65) Prior Publication Data
US 2011/0058602 A1    Mar. 10, 2011

(30) Foreign Application Priority Data
Mar. 26, 2008  (EP) .................... 08102940

(51) Int. Cl.
| | |
|---|---|
| *H03K 7/04* | (2006.01) |
| *H03K 7/06* | (2006.01) |
| *H03K 9/04* | (2006.01) |
| *H03K 9/06* | (2006.01) |
| *H04L 25/49* | (2006.01) |
| *H04B 1/7163* | (2011.01) |
| *H04B 14/02* | (2006.01) |

(52) U.S. Cl.
CPC ........ *H04L 25/4902* (2013.01); *H04B 1/71637* (2013.01); *H04B 14/026* (2013.01)
USPC ....................................... 375/239

(58) Field of Classification Search
USPC ................................. 375/359, 239
See application file for complete search history.

(56) References Cited

U.S. PATENT DOCUMENTS

2008/0095288 A1    4/2008 Schwoerer et al.

OTHER PUBLICATIONS

Miscopein et al., Low Complexity Synchronization Algorithm for Non-Coherent UWB-IR Receivers, 2007, IEEE.*
Miscopein et al., "Low Complexity Synchronization Algorithm for Non-Coherent UWB-IR Receivers", IEEE, 2007, pp. 2344-2348.

* cited by examiner

*Primary Examiner* — Chieh M Fan
*Assistant Examiner* — Wednel Cadeau
(74) *Attorney, Agent, or Firm* — The Webb Law Firm

(57) ABSTRACT

An identification method for a data Sk is disclosed which includes;
a) construction of a chronological sequence $\{T1; \ldots; Ti; \ldots; TN\}$ of times of arrival Ti of pulses or a block of successive pulses,
b) calculation of a value of similarity between this sequence $\{T1; \ldots; Ti; \ldots; TN\}$ and a predetermined chronological sequence $\{TREFk1; \ldots; TREFkj; \ldots; TREFkM\}$ of times of arrival coding the data Sk for several time offsets Ol between the sequence $\{T1; \ldots; Ti; \ldots; TN\}$ and the sequence $\{TREFk1; \ldots; TREFkj; \ldots; TREFkM\}$,
c) identification of the data Sk in the series $\{T1; \ldots; Ti; \ldots; TN\}$ if the calculated value of similarity for one of the time offsets Ol exceeds a predetermined threshold.

20 Claims, 4 Drawing Sheets

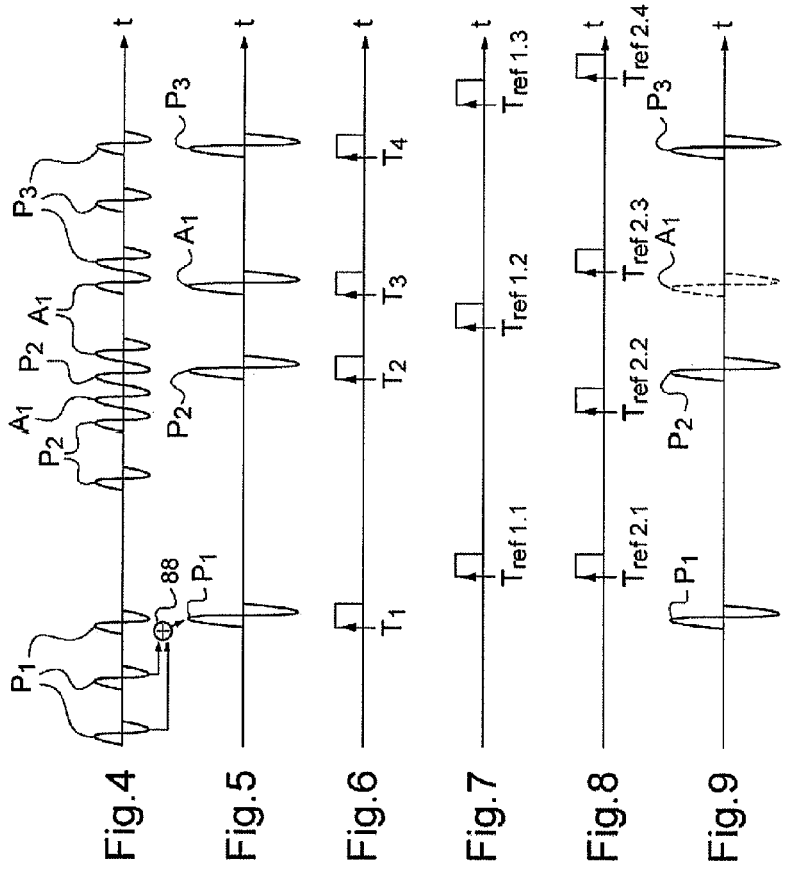
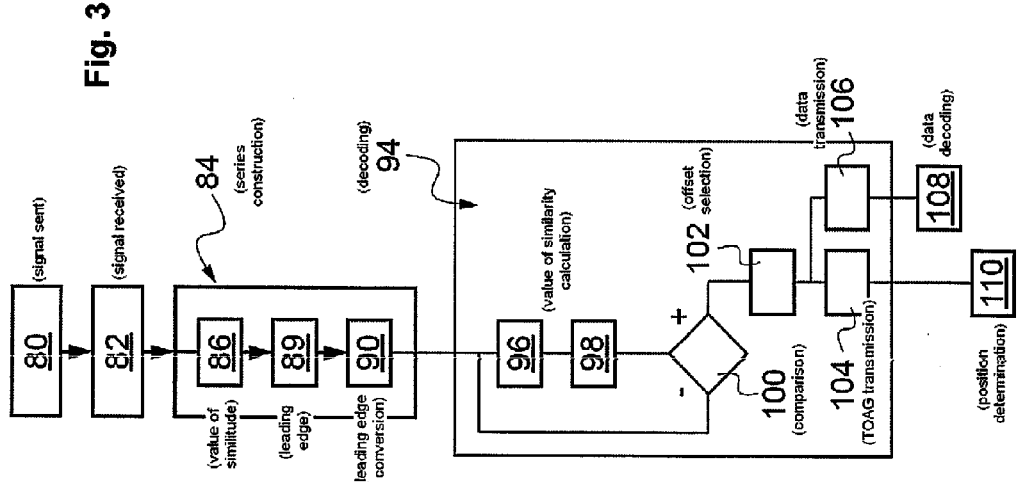

METHOD FOR IDENTIFYING DATA ENCODED BY PPM MODULATION, AND RECEIVER FOR SAID METHOD

This application is a continuation application of prior International Application No. PCT/EP2009/053471, filed on Mar. 24, 2009 and claiming priority to European (EP) Patent Application No. 08102940.7, filed Mar. 26, 2008.

TECHNICAL FIELD

The invention relates to a method of identifying a given data Sk which is encoded by PPM modulation (Pulse Position Modulation) in a received signal. The invention also relates to a receiver of such a signal.

PRIOR ART

In a PPM or time modulation of pulse positions, each pulse may be early or late compared to a known theoretical time of arrival in order to encode such data as, for example, a "0" or a "1". In this description, the term "data" means any type of information, such as a transmitter ID, character, symbol, bit or other.

PPM modulation includes also particular PPM known by the term DPPM modulation (Differential Pulse Position Modulation). In DPPM modulation, the differences between the times of arrival of pulses in a pulse sequence encode the data.

Specifically, when PPM modulation is used, all data transmitted is defined by a sequence of M pulses or M pulse blocks, where M is an integer which is strictly greater than one. M is not necessarily the same for all the encoded data. The temporal arrangement of the M pulses or M pulse blocks of the same sequence represents encoding of the data. The successive times Ti of arrival of these pulses or pulse blocks therefore encode the data transmitted. Each time of arrival Ti is a numerical value indicating a time elapsed since a common origin.

When the amplitudes of the pulses are large enough to allow discrimination of each of them from ambient noise, times Ti may correspond to the times of arrival of each pulse. In this case, the data is encoded by a sequence of M pulses. Conversely, when the amplitudes of the pulses are lower than the ambient noise, pulse blocks are sent. The arrangement of the pulses within each of these blocks is predetermined so that the receiver can easily identify each of these blocks. In this case, the times Ti correspond to the times of arrival of the pulse blocks and the data is encoded by M pulse blocks.

The PPM modulations are used in ultra-wideband technology better known under the term of UWB technology (Ultra Wide Band). Only by way of illustration, the following description is made in this particular context.

The transmission of data by a UWB technology is carried out with a data signal which includes a series of very short pulses without necessarily using a carrier frequency. The duration of these pulses can be less than one nanosecond. As the data pulses are very short in the time domain, by transformation into the frequency domain, one can lead to obtaining an ultra-wide band spectrum, which defines UWB. The frequency spectrum ranges from 500 MHz to several GHz. The frequency bandwidth is generally greater than 25% as compared to the central frequency for a UWB technology.

The pulses can be of different shapes as long as their durations are generally less than one nanosecond. It could be, for example, composed of Gaussian pulses having one or two polarities or wavelets.

Generally, multiple ultra-wideband transmitters and receivers can be near each other. Thus, generally, the signals transmitted between a transmitter and a receiver must also contain a particular data called here the "transmitter ID," which identifies the transmitter which transmitted the signal.

In addition, all codes used for encoding data are, in principle, orthogonal. This means that by correlating them to one another, the result of the correlation gives a value close to zero.

Generally, when a PPM modulation is used, the clock of the receiver must be precisely synchronised to the clock of the transmitter in order to accurately determine if a pulse is ahead or behind a theoretical time of arrival. Such receiver clock synchronisation is often complex to achieve.

DISCLOSURE OF THE INVENTION

A main purpose of the invention disclosed herein consists in proposing a method, which may not include a synchronization and, which may identify data Sk encoded by PPM modulation in a received signal.

It thus concerns a method that may comprise:

a) construction of a chronological series $\{T1; \ldots; Ti; \ldots; TN\}$ of times of arrival Ti of successive pulses contained in a received signal, b) calculation of a value of similarity between this series $\{T1; \ldots; Ti; \ldots; TN\}$ and a predetermined chronological sequence $\{TREFk1; \ldots; TREFkj; \ldots; TREFkM\}$ of times of arrival coding the data Sk for several time offsets Ol between the series $\{T1; \ldots; Ti; \ldots; TN\}$ and the sequence $\{TREFk1; \ldots; TREFkj; \ldots; TREFkM\}$, each value of similarity being representative of the correlation between the series $\{T1; \ldots; Ti; \ldots; TN\}$ and the sequence $\{TREFk1; \ldots; TREFkj; \ldots; TREFkM\}$ for a given time offset Ol, c) identification of the data Sk in the series $\{T1; \ldots; Ti; \ldots; TN\}$ if the value of similarity calculated for one of the time offsets Ol exceeds a predetermined threshold.

Construction of the series $\{T1; \ldots; Ti; \ldots; TN\}$ may not require a time synchronisation between the clocks of the receiver and of the transmitter. Furthermore, calculation of the value of similarity between the series $\{T1; \ldots; Ti; \ldots; TN\}$ and the sequence $\{TREFk1; \ldots; TREFkj; \ldots; TREFkM\}$ for different time offsets may also not require a synchronisation of the receiver and transmitter clocks. Therefore, by using this method, the data Sk may be identified without the transmitter and receiver clocks being synchronised.

In addition, given that one calculates a value of similarity for different possible time offsets, the data Sk may be identified only if a predetermined threshold is exceeded. Due to this, this method is robust against noise. In particular, this method is robust in the presence of parasitic pulses in the received signal causing the appearance of parasitic times in the series $\{T1; \ldots; Ti; \ldots; TN\}$. Such parasitic pulses may for example be caused by multipath signals between the transmitter and the receiver, or generated by other emitters of electromagnetic waves near the transmitter and the receiver.

The method above also limits the consequences of errors in measurement of times of arrival Ti. These errors may result in a measurement of a time Ti which is slightly ahead or behind the time when the pulse or block of pulses has actually been received by the receiver. This error is known as "jitter".

The publication entitled "Low Complexity Synchronisation Algorithm for Non-Coherent UWB-IR Receivers", published in the names of Benoît Miscopein et al. at the occasion of the VEHICULAR TECHNOLOGY CONFERENCE, 2007, VTC2007-SPRING, IEEE 65TH, IEEE, PI, pages 2344 to 2348 (ISBN: 978-1-4244-0266-3), and patent application FR 2877169A, some inventors of which have contributed to the above mentioned publication, disclose methods of a similar kind to that which has been previously described, in which calculations of differences between times of arrival are used to identify a signal. Each difference is calculated between two successive times of arrival, thus allowing a decrease of the "jitter" influence in the identification method. Further solutions are suggested in these documents to decrease even more the "jitter" influence, but such solutions imply a complexification of the processing going in the opposite direction of the present purpose, that is achieving a simplification of the identification method.

The method according to the present invention provides an alternate calculation of the value of similarity which is not based on differences between times of arrival for pairs of times (Ti, Tj). Indeed, when the value of the differences between times of arrival Ti and Tj is used, the errors in the measurement of the times may add up and lead to an erroneous decision, even if these differences are solely calculated between successive times of arrival.

Thus, the present method provides that each value of similarity is computed on the basis of the differences between time pairs (Ti; TREFkj).

Here, thanks to the use of the value of similarity, the errors in the measurement of the times Ti cannot add up, as far as each time Ti is taken into account individually. This improves the robustness of this method with respect to the errors in the measurement of times Ti.

In the above method, only the times of arrival Ti of received pulses are used to identify the data Sk. The amplitude or polarity of the received pulses are not taken into account. This therefore allows easy identification of any of the information emitted by a transmitter distant from a receiver while another transmitter, much closer to the receiver, emits parasitic pulses of much larger amplitudes.

Finally, the series {T1; ...; Ti; ...; TN} may solely contain times of arrival. This series may therefore be easily registered in a small amount of memory. This series may also be easily transmitted over an information transmission line of low bandwidth. Thus, the computation of this series may be easily relocated or moved or executed later.

The embodiments of this method may include one or more of the following characteristics:
  calculation of the value of similarity for a given time offset includes:
    counting the differences between the time pairs (Ti; TREFkj) included in a range of values containing this time offset, and
    computation of the value of similarity from the result of this count;
  calculation of this value of similarity includes:
    incrementation of a counter associated with this range of values with a first predetermined step each time a difference between the time pairs (Ti; TREFkj) occurs within this range, and
    incrementation of the same counter with a second predetermined step each time a difference between the time pairs (Ti; TREFkj) occurs within an adjacent range of values, the second predetermined step being less than the first predetermined step.
  method includes:
    calculation of the value of similarity for all possible time offsets, and
    computation of a global time of arrival TOAG for the data Sk from the time offset for which the calculated value of similarity is the highest;
  method includes the determination of the distance between the transmitter and the receiver or of the position of the transmitter in relation to the receiver which received the signal and also from the computed time TOAG;
  method includes decoding of a data Dt which is encoded in the received signal from the successive computed times TOAG;
  data Sk is an identifier of the transmitter of the received signal;
  construction of the series {T1; ...; Ti; ...; TN} includes:
    calculation of a value of similitude between samples of the received signal and a predetermined block of several pulses,
    generation of a new time Ti indicating the time at which this value of similitude has exceeded a predetermined threshold;
  method includes:
    calculation of several values of similitude between the last samples obtained and respective predetermined blocks of several pulses, each predetermined block coding a respective data Db, and
    transmission of the data Db to a processing unit for this data each time that the value of similitude associated to this data exceeds a predetermined threshold;
  method includes filtering the received signal as a function of the identified Sk signal to eliminate the pulses or the blocks of parasitic pulses not coding the data Sk.

Embodiments of the method according to the invention may further present the following benefits:
  calculating the value of similarity from the differences between time pairs (Ti; TREFkj) prevents an accumulation of errors in measurement of times Ti;
  calculating the value of similarity from the counting of differences between time pairs (Ti; TREFkj) simplifies calculation of such similarity value,
  computation of the time TOAG from the different calculated values of similarity allows calculating the time offset without having to synchronise the clocks of the transmitter and of the receiver,
  determining the distance or position of the transmitter from the computed time TOAG provides more accurate results,
  coding additional data Dt using different successive computed times TOAG allows decoding of this data Dt without a synchronisation of the receiver and transmitter clocks being necessary,
  when data Sk is a transmitter identifier, the method allows identifying this transmitter without synchronisation of the receiver and transmitter clocks,
  constructing each of the times Ti from a value of similitude between the last obtained samples and a predetermined block of pulses allows improvement of the signal to noise ratio,
  using different predetermined pulse blocks allows coding of additional data Db using these blocks.

The invention also relates to a receiver of a signal containing a PPM (Pulse Position Modulation) encoded data Sk in which the receiver may include:
  a constructor of a chronological series {T1; ...; Ti; ...; TN} of times of arrival Ti of successive pulses or blocks of pulses contained in the received signal,
  a calculator capable of:
    constructing a value of similarity between this series {T1; ...; Ti; ...; TN} and a predetermined chronological sequence {TREFk1; . . . ; TREFkj; . . . ; TREFkM} of times of arrival coding the data Sk for several time offsets Ol between the series {T1; . . . ; Ti; . . . ; TN} and the sequence {TREFk1; . . . ; TREFkj; . . . ; TREFkM}, each value of similarity being representative of the correlation between the series {T1; . . . ; Ti; . . . ; TN} and the sequence {TREFk1; . . . ; TREFkj; . . . ; TREFkM} for a given time offset Ol, identifying data Sk in the series {T1; . . . ; Ti; . . . ; TN} if the calculated value of similarity for the time offset 01 exceeds a predetermined threshold.

BRIEF DESCRIPTION OF THE DRAWINGS

The invention will be better-understood by reading the description which follows, given solely by way of a non-limiting example and with reference to the drawings in which:

FIG. 3 is a flow chart of a method to identify the data Sk being processed by the receiver in FIG. 1;

FIGS. 4 to 9 are schematic illustrations of different timing signals processed by the receiver in FIG. 1;

DETAILED DESCRIPTION

Figure 1:
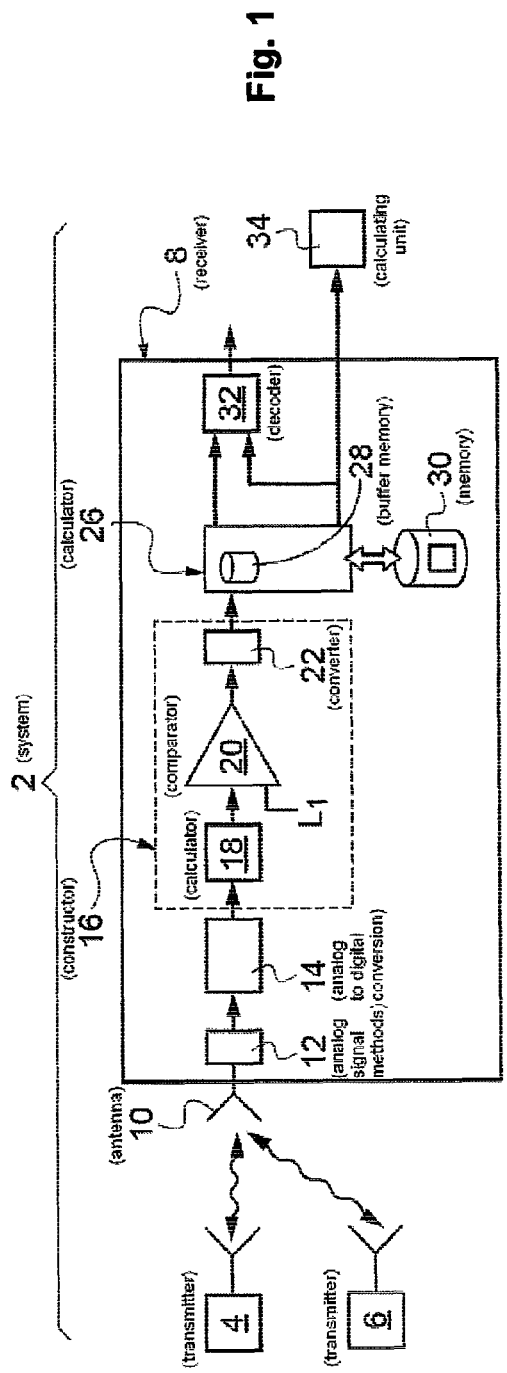
FIG. 1 is a schematic illustration of a receiver of a given PPM encoded data Sk.

FIG. 1 shows a system 2 for transmitting signals between transmitters and receivers. For illustration purposes, system 2 uses UWB for transmission of these signals.

Figure 2:
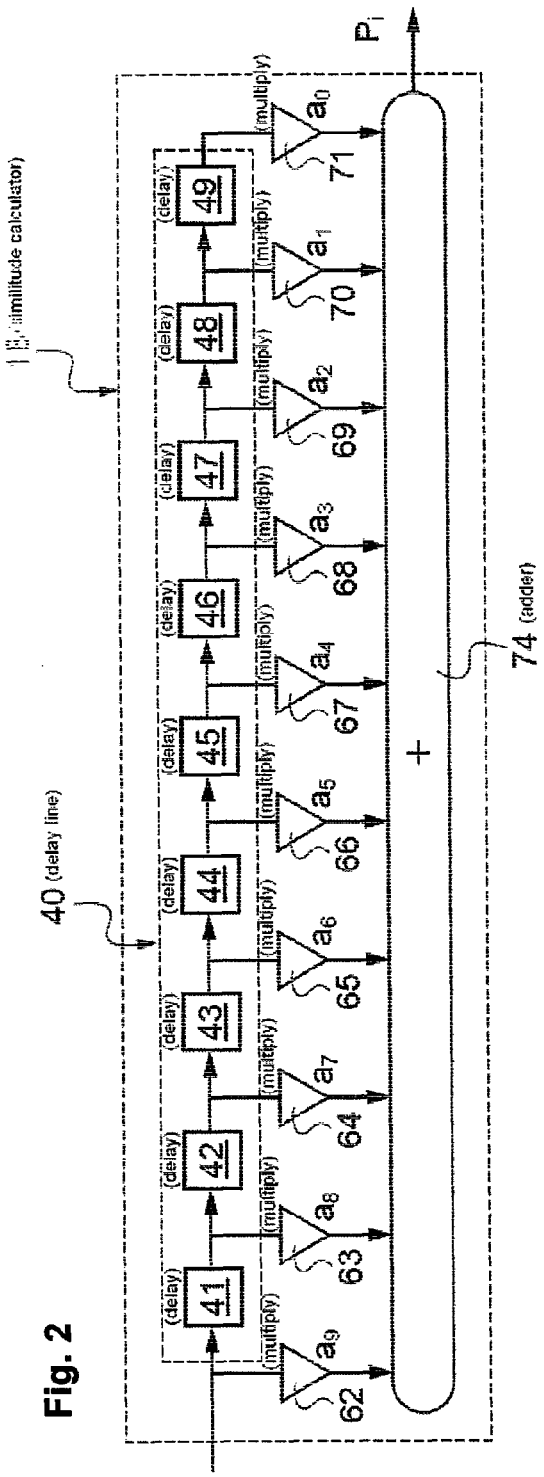
FIG. 2 is a schematic illustration of a calculator of similitude values used in the receiver in FIG. 1.

To simplify FIG. 2, only two transmitters 4 and 6 were represented and one sole receiver 8.

The transmitters 4 and 6 are each able to transmit a sequence of pulses coding respectively, one data S1 and S2 using PPM modulation. Here, one considers that the data S1 and S2 are, respectively, identifiers for transmitters 4 and 6. More precisely, the S1 and S2 data are encoded by the times of arrival of a predetermined block of pulses. The S1 and S2 data are noted as Sk, where k is an integer number which can take the value 1 or 2.

Here, this block of pulses is the same, the signal being either transmitted by transmitter 4 or 6. Each pulse in each block is less than 5 ns, preferably less than 1 ns. A sequence comprises M predetermined blocks of successive pulses. The value of M is not necessarily the same for the sequence coding S1 as for that coding S2.

Moreover, each of these transmitters is able to encode a data Dt, by using DPPM modulation between the global times of arrival (TOAG) of the sequences coding the data S1 or S2.

The receiver 8 is furnished with a UWB antenna 10. This antenna is linked to a block 12 which allows executing different analogue methods on the received signal which are necessary to allow a conversion of a received analogue signal into a digital signal. The output of block 12 is connected to the input of an analogue-digital converter 14. The period Te of sampling of the converter 14 is chosen to be less than half the duration of a pulse and, preferably, at least ten times less than the duration of a pulse contained in the received signal.

An output of the converter 14 delivers the received, sampled signal to an input of a constructor 16 of a series {T1; . . . ; Ti; . . . ; TN} of times of arrival Ti of pulse blocks contained in the received signal.

For example, in relation to this, the constructor 16 includes a calculator 18 of a value of similitude between the last samples of the received signal and the predetermined block of pulses. For example, the last received samples correspond to those taken over a period of the received signal which lasts longer than the pulse block and shorter than two blocks of pulses. This calculator 18 is described in more detail in regards to FIG. 2.

The calculator 18 delivers, to an output, a value of similitude between the last received samples and the predetermined block of pulses. The more the correlation between the signal received and this predetermined block of pulses is important, the greater this value of similitude.

This output from the calculator 18 is connected to the input of a comparator 20. The comparator 20 constantly compares the value of similitude to a predetermined threshold L1. At the time where this value of similitude exceeds threshold L1, the comparator 20 generates a pulse leading edge on a signal transmitted to the input of a time-digital converter 22. This converter 22 is better known as a "Time to Digital Converter." The converter 22 generates, for each pulse leading edge received at its input, a numerical value corresponding to the time Ti at which the pulse edge is produced. In this way, the constructor 16 delivers a chronological series of times of arrival Ti. The series of N times Ti constructed during one sequence is noted {Ti; . . . ; Ti; . . . ; TN}. N does not necessarily have the same value as M (number of pulse blocks in a sequence). For example, the series {T1; . . . ; Ti; . . . ; TN} can include supplemental parasitic times.

The output of the converter 22 is connected to an input of a calculator 26 of values of similarity between the series {T1; . . . ; Ti; . . . ; TN} and a predetermined sequence SREFk of times of arrival. The SREFk sequence solely contains the theoretical times of arrival of the pulses coding the data Sk. These theoretical times are noted as TREFkj and the SREFk sequence can also be written in the form {TREFk1; . . . ; TREFkj; . . . ; TREFkM}. Each SREFk sequence therefore characterises a data Sk which can be received by the receiver. These sequences are pre-registered in a memory 30 connected to calculator 26. Here, the memory 30 contains at least the sequences SREF1 and SREF2, respectively coding the data S1 and S2.

The value of similarity is representative of the correlation between the series {T1; . . . ; Ti; . . . ; TN} and the SREFk sequence. Here, the more the correlation between the series and the sequence is important, the larger this value of similarity.

In order to carry out this task, the calculator 26 is also equipped with a buffer memory 28 which can store the series {T1; . . . ; Ti; . . . ; TN}.

The calculator 26 is connected by its output to a decoder 32 and to a calculating unit 34 of the distance between the receiver 8 and the transmitters 4 and 6 or of the position of these transmitters 4 and 6. Here, the unit 34 is an external unit situated outside receiver 8.

Decoder 32 is able to decode the data Dt.

FIG. 2 represents a specific embodiment of similitude calculator 18. Here, this similitude calculator is implemented in the form of a filter adapted to the predetermined block of pulses. More specifically, this is a finite pulse response filter, better known under the term FIR (Finite Impulse Response).

For example, the calculator 18 includes a delay line 40 composed of a succession of blocks 41 to 49 which are each able to delay for a sampling period Te the sampled signal received by the input of this line 40. The blocks 41 to 49 are for example bascules D.

Here, the number of blocks in the line 40 was limited to nine only to simplify the illustration.

The input and output of each of these blocks 41 to 49 are connected via respective multipliers 62 to 71 to an adder 74. Each of the multipliers 62 to 71 is able to multiply the input signal by a coefficient, respectively a0 to a9. The coefficients a0 to a9 are chosen according to the predetermined block of pulses such that the received signal samples are added to each other in a constructive way in the adder 74 only when the received signal contains a block of pulses identical to the predetermined pulse block.

Thus, the output of the adder 74 is a value of similarity. This value is only important if the last samples of the received signal correspond to the predetermined pulse block.

The function of the receiver of system 2 will now be described in more detail in regards to the method shown on FIG. 3 with the aid of timing diagrams in FIGS. 4 to 8.

Initially, at a step 80, the transmitters 4 and 6 each send a signal to the receiver 8 using UWB technology.

Here, in the remainder of this description, one deals only with the signal sent by transmitter 4. The processing of the signal sent by transmitter 6 can be inferred from the explanations given in relation to the signal sent by transmitter 4.

Here, transmitter 4 sends pulse sequences. Each of these pulse sequences encodes the data S1 by PPM modulation. Moreover, the transmitter 4 encodes the data Dt by modulating the global times of arrival (TOAG) of the sequences.

FIG. 4 represents an illustration of a sequence of pulses transmitted by the transmitter 4 in the particular case where this sequence is composed of three identical pulse blocks P1, P2 and P3. For example, each block is formed by the repetition of the same pulse. Here, the pulse is repeated three times in each block.

Moreover, in FIG. 4, there is a representation of a parasitic block of pulses A1. This parasitic block is identical to blocks P1, P2 and P3, but time offseted in reference to these blocks. For example, block A1 is generated by a reflection of the signal transmitted on an obstacle or by another user using the same block.

During stage 82, the signal transmitted by the transmitter 4 is received and captured by the antenna 10, of the receiver 8. Then, it traverses the block 12 before being sampled by the converter 14.

During stage 84, the constructor 16 constructs from the sampled received signal the series $\{T1; \ldots; Ti; \ldots; TN\}$. More precisely, during an operation 86, the calculator 18 calculates the value of similitude between the last received samples and the predetermined block of pulses. Here, the predetermined pulse block corresponds to one of the blocks P1, P2 and P3 represented in the FIG. 4. More precisely, the samples are received in the delay line 40. At each sampling period, the samples contained in the delay line are offseted by one block to the right and the adder 74 carries out the addition of these samples after they have been multiplied by the coefficients a0 to a9. Thus, at each sampling period Te, the result of this addition, that is, the value of similitude is delivered to the input of the comparator 20.

As shown by a plus sign 88 between FIGS. 4 and 5, the calculator 18 carries out a type of addition of pulses of the pulse block P1 to construct a single increased amplitude pulse also designated by the marker P1 in FIG. 5.

Then, during an operation 89, each time the comparator 20 detects that the value of similarity exceeds the threshold L1, it generates a pulse leading edge on an output signal. This output signal is illustrated in FIG. 6.

Then, during an operation 90, the converter 22 converts each pulse leading edge to a numerical value Ti which is transmitted to the calculator 26.

Here, each time Ti represents the time of arrival of a block of pulses.

Thus, the constructor 16 constructs the series $\{T1; \ldots; Ti; \ldots; TN\}$. In the example shown in FIG. 6, this series includes only four times T1 to T4 among which time T3 is a parasitical time.

Next, the calculator 26 carries out a first step 94 of decoding of this series $\{T1; \ldots; T4\}$.

At the beginning of step 94, during an operation 96, the calculator 26 calculates the values of similarity between the series $\{Ti; \ldots; T4\}$ and the sequence SREF1 for different time offsets Ol. For example, the sequence SREF1 includes solely three times of arrival and is written $\{TREF11; \ldots; TREF13\}$. The sequence SREF1 is illustrated in FIG. 7. This sequence contains the theoretical times of arrival of the pulse blocks P1 to P3 coding the S1 data.

To calculate these values of similarity, the calculator 26 calculates all the differences between the pairs (Ti; TREF1j). For example, here, the calculator 26 calculates the following differences:

$T1 - TREF11 = -2$ $T1 - TREF12 = -11$ $T1 - TREF13 = -19$ $T2 - TREF11 = 7$ $T2 - TREF12 = -2$ $T2 - TREF13 = -10$ $T3 - TREF11 = 10$ $T3 - TREF12 = 1$ $T3 - TREF13 = -7$ $T4 - TREF11 = 15$ $T4 - TREF12 = 6$ $T4 - TREF13 = -2$

Here, the numbers given above represent the durations of the time intervals separating the time pairs (Ti; Tj) expressed as a number of the sampling period Te.

Figure 10:
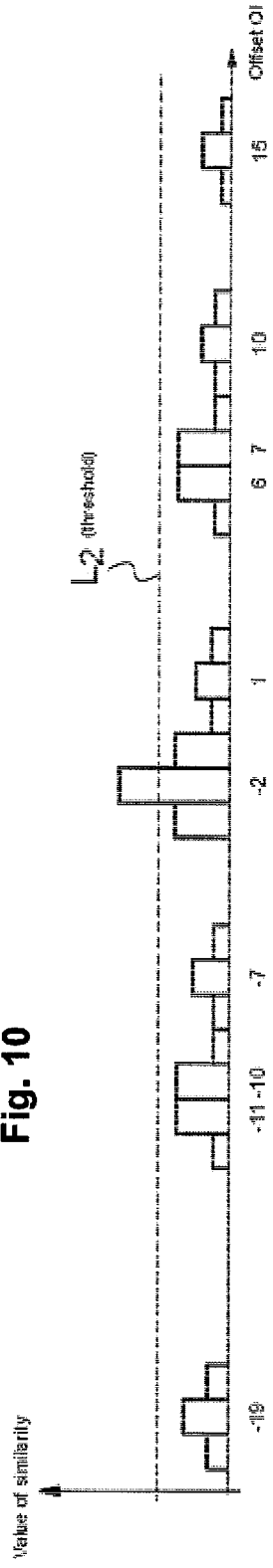
FIG. 10 is a histogram showing the calculation of a value of similarity.

Then, a histogram of the different difference values obtained may be built. This histogram is represented in FIG. 10 and corresponds to the numbers given above.

Each time that the difference value takes a given value, a counter corresponding to that given value is incremented by a predetermined step. Here, the predetermined step is chosen to be equal to one. Moreover, to make the method more robust in regards to "jitter," one also increments by a lower predetermined step, the counters associated to the values immediately inferior and superior to the given value. For example, the inferior step is equal to 0.5.

For example, the counter associated to the value "−2" is incremented by three because the difference "−2" appears three times. One also increments by 1.5 the counters associated to the values "−3" and "−1".

At the same time, the counter associated to the value "−19" is incremented only by one because the value "−19" only appears once, and the counters associated to the values "−20" and "−18" are only incremented by 0.5.

In the histogram in FIG. 10, each counter corresponds to a possible time offset Ol between the series {T1; ...; T4} and the sequence SREF1. The value of each counter corresponds to the value of similarity between the series {T1; ...; T4} and the sequence SREF1 for the time offset Ol associated with this counter.

Then, during an operation 100, each value of similarity is compared to a predetermined threshold L2 (see FIG. 10). If the threshold L2 is not exceeded by any value of similarity, the method returns to operation 96 to calculate this time the values of similarity between the series {T1; ...; T4} and the sequence SREF2 coding the S2 data. An example of sequence SREF2 is represented in FIG. 8. In this other reference series, the instants TREF21 to TREF24 correspond to the arrival times of the pulse blocks coding the data S2.

In the case where the threshold L2 is exceeded by one of the values of similarity calculated during the operation 98, then the calculator 26, during an operation 102, identifies the presence of the data Sk in the series {T1; ...; T4}.

Moreover, during the operation 102, the calculator 26 selects the time offset Ol associated with the largest value of similarity. For example, in the example shown in FIG. 10, during step 102, the calculator 26 selects the time offset "−2".

Then, the overall time of arrival TOAG of the sequence S1 is determined from the time offset Ol. For example, the time TOAG is taken as equal to the time offset Ol associated with the largest value of similarity.

During an operation 104, the calculator 26 transmits the time TOAG to decoder 32 and to unit 34.

In parallel to operation 104, during an operation 106, the calculator 26 also transmits the identified data S1 to the decoder 32.

During step 108, from the different times TOAG transmitted by the calculator 26 and the data Sk associated with each of these times, the decoder 8 decodes the data Dt contained in the signal transmitted by the transmitter 4.

In parallel, during a step 110, unit 34 determines the position of transmitter 4 from the times TOAG transmitted by the receiver 8 as well as by other receivers situated near the transmitter 4. Unit 34 is also able to determine the distance which separates the receiver 8 from the transmitter 4 from the different times TOAG delivered by the receiver 8. For this, conventional algorithms can be used. Eventually, in order to estimate the distance between the transmitter and the receiver, a synchronisation between the transmitter and receiver is required in addition to the knowledge of the time TOAG. Also, to estimate the position of a transmitter, a synchronisation between the receivers could be necessary.

Figure 11:
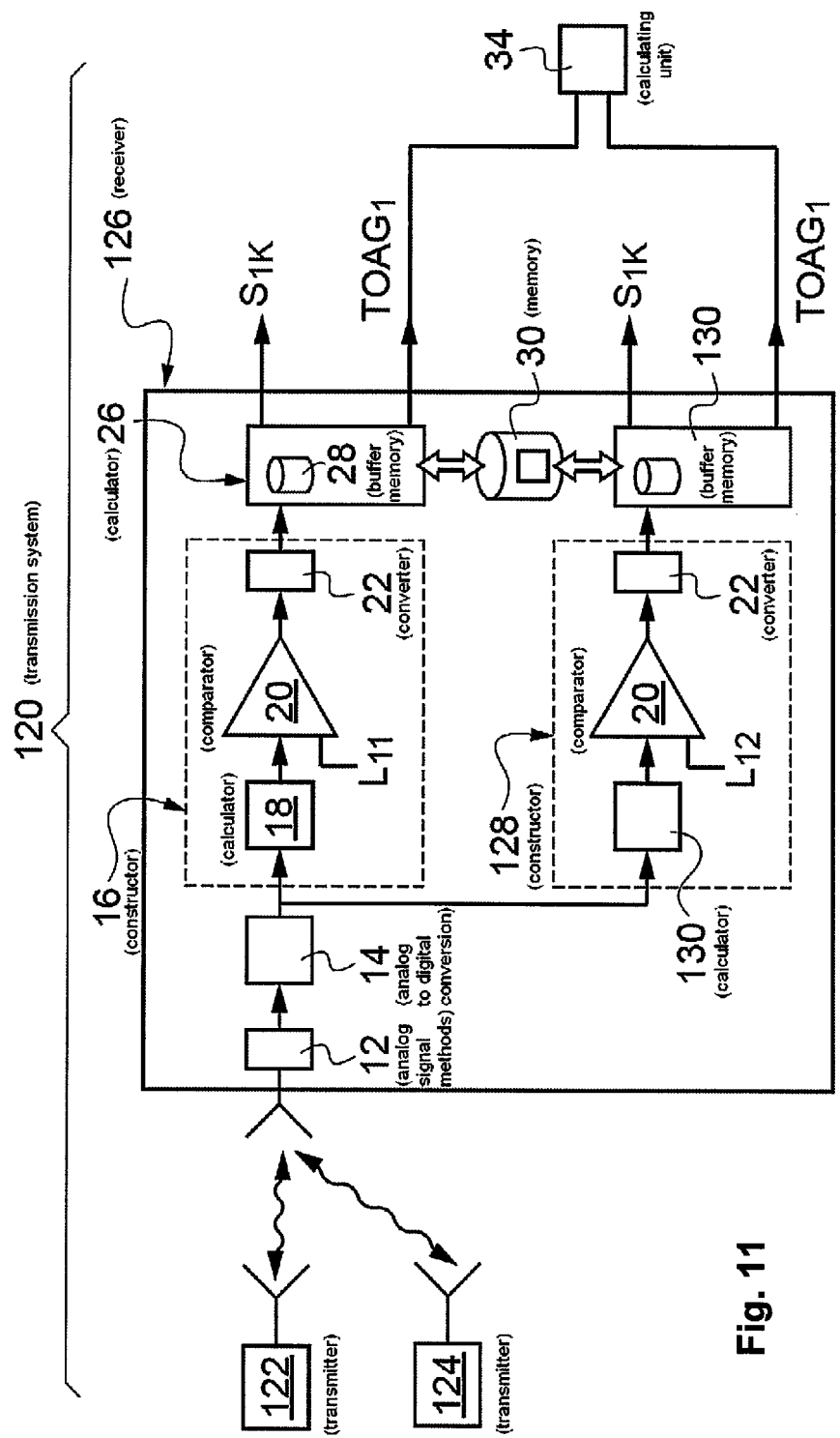

FIG. 11 shows a system 120 for transmitting information between transmitters and receivers. In FIG. 11, only transmitters 122 and 124 and a receiver 126 are represented. This system 120 differs from system 2 in that the identifying data of the transmitters 122 and 124 is encoded in each pulse block. Thus, the arrangement of the pulses in the block of pulses B1 transmitted by the transmitter 122 identifies this transmitter. It is the same for the block of pulses B2 transmitted by the transmitter 124. Since the transmitters 122 and 124 can be identified by their respective block of pulses, it is no longer necessary for the data Sk to also identify these transmitters. In this embodiment, the data S1 and S2 correspond therefore to another information than the identifying data of the signal transmitter.

The receiver 126 is identical to the receiver 8 except for the fact that it includes an additional constructor 128 connected to the input of the supplemental calculator 130 of values of similarity.

The constructor 128 is identical to the constructor 16 except for the fact that the calculator 18 is replaced by a calculator 130. The calculator 130 is, for example, a suitable filter. However, in the case of the calculator 130, this filter is adapted to block B2. In contrast, the filter of the calculator 18 is adapted to block B1.

Thus, the constructor 16 solely constructs the series of times of arrival for the B1 block of pulses, while the constructor 128 constructs solely the series of the times of arrival for the B2 blocks of pulses.

The calculator 130 is identical to calculator 26 except that it processes the series of times of arrival of B2 pulse blocks.

In this embodiment, the decoder 32 can be omitted. Indeed, decoding of the data Sk is directly carried out by the calculators 26 and 130.

Figure 12:
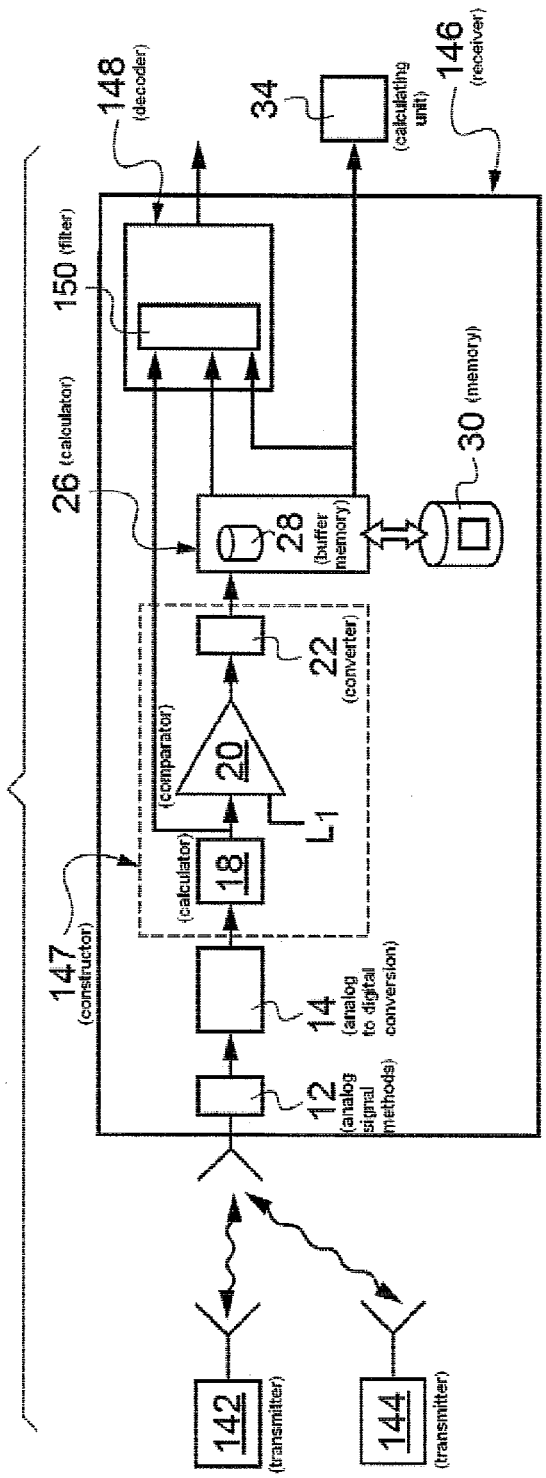
FIGS. 11 and 12 are schematic illustrations of two other possible embodiments of the receiver.

FIG. 12 shows a system 140 for transmitting information between transmitters and receivers. To simplify the figure, only two transmitters, 142 and 144, and a receiver 146 were represented.

In this embodiment, the identifying data S1 and S2 of transmitters 142 and 144 are encoded in each pulse sequence by PPM modulation. Moreover, a data Dk is also encoded in each sequence in using for this purpose the amplitude or the polarity of the sequence pulses. No data is encoded in the pulse blocks.

The receiver 146 is identical to the receiver 8 except that the constructor 16 is replaced by a constructor 147. The constructor 147 is identical to the constructor 16 except that the output of the calculator 18 is also directly connected to a decoder 148.

One recalls that an example of the signal generated at the output of calculator 18 is represented in FIG. 5. At this place, the signal generated by the calculator 18 still includes the information on the amplitude or the polarity of each of the pulses transmitted by the transmitter.

The decoder 148 receives the signal generated by the calculator 18, the data Sk identified by the calculator 26 is the time TOAG selected by the calculator 26.

The decoder 148 includes here a filter 150 able to eliminate parasitic pulses present in the signal generated by the calculator 18 on the basis of the data Sk and the time TOAG. For example, for this purpose, the filter 150 uses the data Sk to identify a mask including time windows situated solely at the places where the P1 to P3 pulses must be received. This mask is synchronised in relation to the signal generated by the calculator 18 in using to this purpose the time TOAG. Any pulse included in the signal generated by the calculator 18 which is situated outside one of these time windows is eliminated. Thus, as represented in FIG. 9, this filter allows eliminating the parasitic Al pulse. Then, the decoder 148 decodes the data Dk contained in the signal filtered by the filter 150. This decoding of the encoded data Dk in amplitude or in polarity is conventional.

Many other embodiments are possible. For example, other embodiments of the similitude calculator are possible. For example, the method described in the patent application EP 1 553 426 can be used to identify the time of arrival for a block of pulses. The calculator of similitude values can also carry out a conventional correlation between the received signal and the predetermined block of pulses.

The calculation of similitude can also be carried out on the received analogue signal. Thus, the analogue-digital converter can be omitted.

If the amplitude of each pulse is sufficient to exceed the amplitude of noise, then the times of arrival Ti correspond to the times of arrival for each pulse. In this case, the similitude calculator can be omitted.

Many other embodiments of the calculator of values of similarity are also possible. For example, the counter associated with a time offset is incremented not as the value of the difference between the pairs of times (Ti; TREFkj) is equal to this time offset, but as soon as the difference is included in a predetermined range of values containing this time offset. In this embodiment, the counters associated with the adjacent ranges can also be incremented by a lower determined step. Preferably, in this embodiment, the range of values is strictly greater than the duration of a pulse. The size of the range of values will however be less than half the smallest time interval separating two pulse blocks.

The value of similarity can be calculated each time that a new time Ti is received. This value of similarity can also be calculated at a regular interval, for example, each millisecond. Typically, the regular interval is chosen to be greater than the duration of reception of the data Sk and preferably greater than two times the reception duration of the data Sk.

The time TOAG can be determined from the mean value of the times Ti or by adding the different times Ti or from the median of the times Ti.

The data can be encoded in a large number of different ways in the received signal. For example, a data Dk and the identifier of the transmitter can simultaneously be encoded within the same sequence by PPM modulation. In this case, for each transmitter, the memory 30 contains two reference sequences SREF11 and SREF12. The sequence SREF11 corresponds to a sequence transmitted by this transmitter and coding a first value of the data Dk. The sequence SREF12 also corresponds to a series of characteristic times of the same transmitter but coding a second value of the data Dk. In this case, while the calculator 26 assesses that the value of similarity between the series {T1; ... ; Ti; ... ; TN} and the sequence SREF11 exceeds the threshold L2, this corresponds to the simultaneous decoding of the two following information:

the identity of the transmitter, and
the encoded value of the data Dk.

In this embodiment, the decoder can be omitted.

Data other than the identifier of the transmitter can also be encoded within each pulse block. The coding of these data in each block can be carried out using a PPM modulation or using a modulation of amplitude or polarity. In this case, the decoding of the data Db encoded in each block is carried out by the calculator of the value of similitude.

The decoder 32 can be omitted if only the data Sk must be decoded.

As an alternate embodiment, the positioning unit can be incorporated within the receiver.

Conversely, the value of similarity calculator can be moved and placed outside the receiver. This is made possible by the fact that the series {T1; ... ; Ti; ... ; TN} can be transmitted remotely by using a low bandwidth. Indeed, in this series, the information relating to amplitude or polarity of the pulses was omitted.

What has been described above applies to technologies other than UWB technology. For example, the identification method for the symbol Sk can be applied to information transmission systems using CDMA technology or optical transmission systems.

What is claimed is:

1. A method for identifying a data Sk encoded by PPM modulation (Pulse Position Modulation) in a received signal, said method comprising:

a) construction of a chronological series {T1; ... ; Ti; ... ; Tn} of times of arrival Ti of successive pulses or blocks of pulses contained in said received signal, b) calculation of a value of similarity between said series {T1; ... ; Ti; ... ; TN} and a predetermined chronological sequence {TREFk1; ... ; TREFkj; ... ; TREFkM} of times of arrival coding said data Sk for several time offsets Ol between said series [T1; ... ; Ti; ... ; TN] and said sequence {TREFk1; ... ; TREFkj; ... ; TREFkM}, each value of similarity being based on differences between time pairs (Ti; TREFkj) so as to be representative of a correlation between said series {T1; ... ; Ti; ... ; TN} and said sequence {TREFk1; ... ; TREFkj; ... ; TREFkM} for a given time offset Ol, c) identification of said data Sk in said series {T1; ... ; Ti; ... ; TN} if said calculated value of similarity for one of said time offsets Ol exceeds a predetermined threshold, wherein said calculation of said value of similarity for a given time offset includes:

counting differences between time pairs (Ti; TREFkj) which are included in a range of values containing said time offset, and computation of said value of similarity from a result of said counting step.

2. The method of claim 1, in which calculating said value of similarity comprises:

incrementation of a counter associated with said range of values with a first predetermined step each time a difference between said time pairs (Ti; TREFkj) falls within said range, and incrementation of said counter with a second predetermined step each time a difference between said time pairs (Ti; TREFkj) falls within an adjacent range of values, said second predetermined step being less than said first predetermined step.

3. The method of claim 1, comprising:

calculation of said value of similarity for all possible time offsets, and computation of a global time of arrival TOAG for the data Sk based on the time offset for which the calculated value of similarity is the highest.

4. The method of claim 1, in which said data Sk is an identifier of a transmitter of said received signal.

5. The method of claim 1, in which construction of the series {T1; ... ; Ti; ... ; TN} comprises:

calculation of a similitude value between samples of said received signal and a predetermined block of several pulses, generation of a new time Ti indicating time at which said similitude value has exceeded a predetermined threshold.

6. The method of claim 1, including filtering said received signal as a function of said identified data Sk to eliminate parasitic pulses or blocks of pulses not coding said data Sk.

7. The method of claim 1, in which said data Sk is an identifier of a transmitter of said received signal.

8. The method of claim 1, in which construction of the series {T1; ... ; Ti; ... ; TN} comprises:

calculation of a similitude value between samples of said received signal and a predetermined block of several pulses, generation of a new time Ti indicating time at which said similitude value has exceeded a predetermined threshold.

9. The method of claim 1, including filtering said received signal as a function of said identified data Sk to eliminate parasitic pulses or blocks of pulses not coding said data Sk.

10. The method of claim 2, including determination of a distance between said transmitter and said receiver or of a position of said transmitter in relation to a receiver which received said signal and also from said computed time TOAG.

11. The method of claim 2, comprising:
calculation of said value of similarity for all possible time offsets, and
computation of a global time of arrival TOAG for the data Sk based on the time offset for which the calculated value of similarity is the highest.

12. The method of claim 3, including determination of a distance between said transmitter and said receiver or of a position of said transmitter in relation to a receiver which received said signal and also from said computer time TOAG.

13. The method of claim 3, including decoding of a data Dt encoded in said received signal from successive computer times TOAG.

14. The method of claim 3, in which said data Sk is an identifier of a transmitter of said received signal.

15. The method of claim 5, comprising:
calculation of several similitude values between last samples of said received signal and respective predetermined blocks of several pulses, each predetermined block coding a respective data Db, and
transmission of data Db to a processing unit of said data each time that said similitude value associated to said data exceeds a predetermined threshold.

16. A receiver of a signal containing a data Sk encoded by a PPM modulation, said receiver comprising:
a constructor of a chronological series $\{T1; \ldots; Ti; \ldots; TN\}$ times of arrival Ti of successive pulses or blocks of pulses contained in said received signal,
a calculator capable of:
constructing a value of similarity between said series $\{T1; \ldots; Ti; \ldots; TN\}$ and a predetermined chronological sequence $\{TREFk1; \ldots; TREFkj; \ldots; TREFkm\}$ of times of arrival coding said data Sk for several time offsets Ol between said series $\{T1; \ldots; Ti; \ldots; TN\}$ and said sequence $\{TREFk1; \ldots; TREFkj; \ldots; TREFkM\}$, each value of similarity being based on differences between time pairs (Ti; TREFkj) so as to be representative of a correlation between said series $\{T1; \ldots; Ti; \ldots; TN\}$ and said sequence $\{TREFk1; \ldots; TREFkj; \ldots; TREFkM\}$ for a given time offset Ol,
identifying said data Sk in said series $\{T1; \ldots; Ti; \ldots; TN\}$ if said calculated value of similarity for one of said time offsets Ol exceeds a predetermined threshold,
wherein said constructing of said value of similarity for a given time offset includes:
counting differences between time pairs (Ti; TREFkj) which are included in a range of values containing said time offset, and
computation of said value of similarity from a result of said counting step.

17. The method of claim 1, comprising:
calculation of said value of similarity for all possible time offsets, and
computation of a global time of arrival TOAG for the data SK based on the time offset for which the calculated value of similarity is the highest.

18. The method of claim 17, including determination of a distance between said transmitter and said receiver or of a position of said transmitter in relation to a receiver which received said signal and also from said computed time TOAG.

19. The method of claim 17, including decoding of a data Dt encoded in said received signal from successive computed times TOAG.

20. A method for identifying a data Sk encoded by PPM modulation (Pulse Position Modulation) in a received signal, said method comprising:
a) construction of a chronological series $\{T1; \ldots; Ti; \ldots; Tn\}$ of times of arrival Ti of successive pulses or blocks of pulses contained in said received signal,
b) calculation of a value of similarity between said series $\{T1; \ldots; Ti; \ldots; TN\}$ and a predetermined chronological sequence $\{TREFk1; \ldots; TREFkj; \ldots; TREFkM\}$ of times of arrival coding said data Sk for several time offsets Ol between said series $[T1; \ldots; Ti; \ldots; TN\}$ and said sequence $\{TREFk1; \ldots; TREFkj; \ldots; TREFkM\}$, each value of similarity being based on differences between time pairs (Ti; TREFkj) so as to be representative of a correlation between said series $\{T1; \ldots; Ti; \ldots; TN\}$ and said sequence $\{TREFk1; \ldots; TREFkj; \ldots; TREFkM\}$ for a given time offset Ol,
c) identification of said data Sk in said series $\{T1; \ldots; Ti; \ldots; TN\}$ if said calculated value of similarity for one of said time offsets Ol exceeds a predetermined threshold
d) calculation of said value of similarity for all possible time offsets, and
e) computation of a global time of arrival TOAG for the data Sk based on the time offset for which the calculated value of similarity is the highest.

* * * * *

UNITED STATES PATENT AND TRADEMARK OFFICE
CERTIFICATE OF CORRECTION

PATENT NO.         : 8,837,574 B2
APPLICATION NO.    : 12/934511
DATED              : September 16, 2014
INVENTOR(S)        : Pierre-André Farine et al.

Page 1 of 1

It is certified that error appears in the above-identified patent and that said Letters Patent is hereby corrected as shown below:

In the claims

Column 13, Line 34, Claim 16, delete "TREFkm" and insert -- TREFkM --

Signed and Sealed this
Thirteenth Day of January, 2015

Michelle K. Lee
*Deputy Director of the United States Patent and Trademark Office*